United States Patent [19]

Armand et al.

[11] Patent Number: 4,683,181

[45] Date of Patent: Jul. 28, 1987

[54] ELECTROCHEMICAL GENERATOR WITH COMPOSITE ELECTRODE

[75] Inventors: Michel Armand, Echirolles; Jean-Michel Chabagno, Pau; Philippe Ricoux, Oullins, all of France; Guy Vassort, Longeuil, Canada; Michel Gauthier, Laprairie, Canada; Fernand Brochu, Longeuil, Canada; Philippe Rigaud, Vienne, France

[73] Assignees: Societe Nationale Elf Aquitaine, Courbevoie, France; Hydro-Quebec, Quebec, Canada

[21] Appl. No.: 726,622

[22] Filed: Apr. 24, 1985

[30] Foreign Application Priority Data

Apr. 24, 1984 [FR] France ............................ 8406416

[51] Int. Cl.$^4$ ................... H01M 10/36; H01M 10/40
[52] U.S. Cl. ................... 429/192; 252/182.1; 429/220; 429/221; 429/223
[58] Field of Search ............... 429/192, 220, 221, 223; 252/62.2, 182.1

[56] References Cited

U.S. PATENT DOCUMENTS 4,303,748  12/1981  Armand et al. .................... 429/192
4,556,614  12/1985  Mehaute et al. .................... 429/192

FOREIGN PATENT DOCUMENTS 2485267  3/1978  France .
2493609  5/1982  France ............................. 429/192
8303322  5/1983  PCT Int'l Appl. ................. 429/192

OTHER PUBLICATIONS

*Material for Advanced Batteries*, (1979), NATO CONFERENCES, Murphy, pp. 343 to 347.

*Primary Examiner*—Donald L. Walton
*Attorney, Agent, or Firm*—Oblon, Fisher, Spivak, McClelland & Maier

[57] ABSTRACT

Electrochemical generator, the electrolyte of which is made of a macromolecular material comprising a salt in solution and of which the positive electrode is a composite electrode which comprises as active material a metallic compound adapted to be reduced by the cation of the salt in solution by generating during this reduction new species which can include the zero oxidation degree metal, said generator being able to operate reversibly at ambient temperature.

16 Claims, 7 Drawing Figures

ELECTROCHEMICAL GENERATOR WITH COMPOSITE ELECTRODE

BACKGROUND OF THE INVENTION

1. Field of the Invention

The present invention concerns an electrochemical generator operating reversibly at ambient temperature, the electrolyte of which is a solid solution of an ionic compound in a macromolecular material, which generator is distinguished by the particular nature of the active material of its positive electrode.

2. Discussion of the Background

European patent No. 13199 has already proposed electrochemical generators of the thin film type the electrolyte of which is a solid solution of an ionic compound in a macromolecular material. According to this patent, the positive electrode can be constituted by the agglomeration product, forming a composite mass of the electrochemically active material, of a ionic conduction inert compound and of a macromolecular material that is identical or similar to that constituting the electrolyte. In this cited European patent, the preferred material for producing the electrolyte is a poly(ethylene polyoxide). Numerous materials have been proposed as electrochemically active material. However, the choice of such materials is much more limited when it is desired to produce rechargeable generators that are able to provide high and stable voltages through the charge and discharge cycles.

In order to obtain generators operating at ambient temperature, it is preferable to select a macromolecular material constituted by an ethylene oxide copolymer and a cyclic ether oxide, substituted or not, presenting a polyether type chain. A material in the form of a single thermodynamically stable phase which facilitates correct operation of these generators at ambient temperature is thus obtained. In association with these electrolytes, a certain number of electrochemically active materials exist that can be utilized and which allow reversible operation at ambient temperature. For example, derivatives of transition elements such as molybdenum dioxide, vanadium oxide and titanium disulphide may be cited. These compounds present the common property of essentially giving rise to insertion reactions with the salt cation in solid solution within the electrolyte material.

The utilization of these materials, herein-after referred to as insertion materials since they essentially give rise to insertion reactions, present several drawbacks. Generally, they are costly materials the synthesis of which is difficult to carry out. Furthermore, the insertion reactions only involve about a single electron per atom of active material (between 1 and 1.5). Due to this fact, the theoretical capacity of the electrode is small. When the active material is, for example, vanadium oxide $V_6O_{13}$, this capacity is about 420 Ah/kg of active material. When the active material is $TiS_2$ this capacity is about 250 Ah/kg of active material.

It has, on the other hand, been proposed without great success to use various electrode materials other than insertion materials to produce secondary electrochemically active generators, but however these materials were associated with electrolytes that are very different from those concerned by the generators according to the present invention, such as, for example, molten salts or organic solvents. Until now, the best example proposed is that of a generator utilizing an iron pyrite as the active material of an electrode, this electrode being associated to an organic electrolyte operating at ambient temperature (AMBIENT TEMPERATURE SECONDARY Li/FeS$_2$ CELLS G. H. NEWMAN; L. P. KLEMANN, Proceedings of the 29th Power Sources Conference, June 1980). According to this article, an attempt had been made to produce a rechargeable generator operating at ambient temperature. The authors of this article tested a whole series of organic electrolytes such as, or example, dioxolanedimethoxyethane mixture comprising in solution a lithium organo-borate, the aim of these tests being to locate an electrolyte couple of electrode material allowing good cycling of the generator at ambient temperature. By referring to the above-mentioned article, it can be seen that these tests were not favorable since the best cycling performance realized only allowed to achieve 22 cycles with discharge capacities that considerably decreased as the number of cycles was progressively increased. For example, an initial value of 128 mA-hours for the first cycle decreased to 71 mA-hours for the 22nd cycle, which illustrates a sharp decrease in capacity. The authors of the above article thus concluded that they were not yet able to carry out reversible operating of a generator over a great number of cycles, at ambient temperature, when the electrode material is $FeS_2$, i.e. a material giving rise, during its reduction, to the nucleation of new species. For a fuller explanation of the different reactions involved by this reduction, reference may be made, for example, to the article of M. B. CLARK LITHIUM BATTERIES, Edited by J. M. GABANO 1983, ACADEMIC PRESS.

Without wishing to advance a limitative scientific theory, the authors of the present invention feel able to explain this impossibility of using $FeS_2$ as the electrode material of a reversible liquid electrolyte accumulator at ambient temperature by the fact that the transport mechanisms of these electrolytes allow novel species generated during reduction to migrate or to diffuse due to the absence of selectivity; this absence of selectivity modifies the electrochemical processes or the availability of active materials during the discharge or charge of the generator.

SUMMARY OF THE INVENTION

On the contrary, the inventors have discovered that it was possible to operate an electrochemical generator at ambient temperature and reversibly, over a great number of cycles, provided that a generator according to the present invention was used.

In order to do this, the invention provides an electrochemical generator comprising a negative electrode, an electrolyte constituted by a solid solution of at least one salt in solution in a macromolecular material, the said solution being constituted to a large extent by an amorphous structure of the polyether type and presenting sufficient ionic conductivity to allow operating of the generator at ambient temperture, and a composite positive electrode constituted by the agglomeration product of a solid solution of at least one salt in solution in a macromolecular material essentially constituted by an amorphous structure of the polyether type, by an electrochemically active material and, possibly, by an electronic conductor. According to the invention, in this generator, the electrode active material is a metal compound able to be reduced by the salt cation in solution within the electrolyte, this reduction occuring during the discharges, the said metal compound generating during the said reduction one or several new species including the metal with an oxidation degree equal to zero. According to the nomenclature adopted in "Material for Advanced Batteries" NATO CONFERENCES, 1979 MURPHY, pages 343, 347; such materials are called "displacement materials". The man skilled in the art will easily understand that when reference is made to displacement materials, materials that are not simply displacement materials and which present characteristics of insertion materials may also be included, the importance being that the displacement characteristics are the principal ones. By way of illustration, it is considered that manganese oxide $MnO_2$ is a displacement material, although it may also give rise to insertion reactions.

DETAILED DESCRIPTION OF THE PREFERRED EMBODIMENTS

Figure 1:
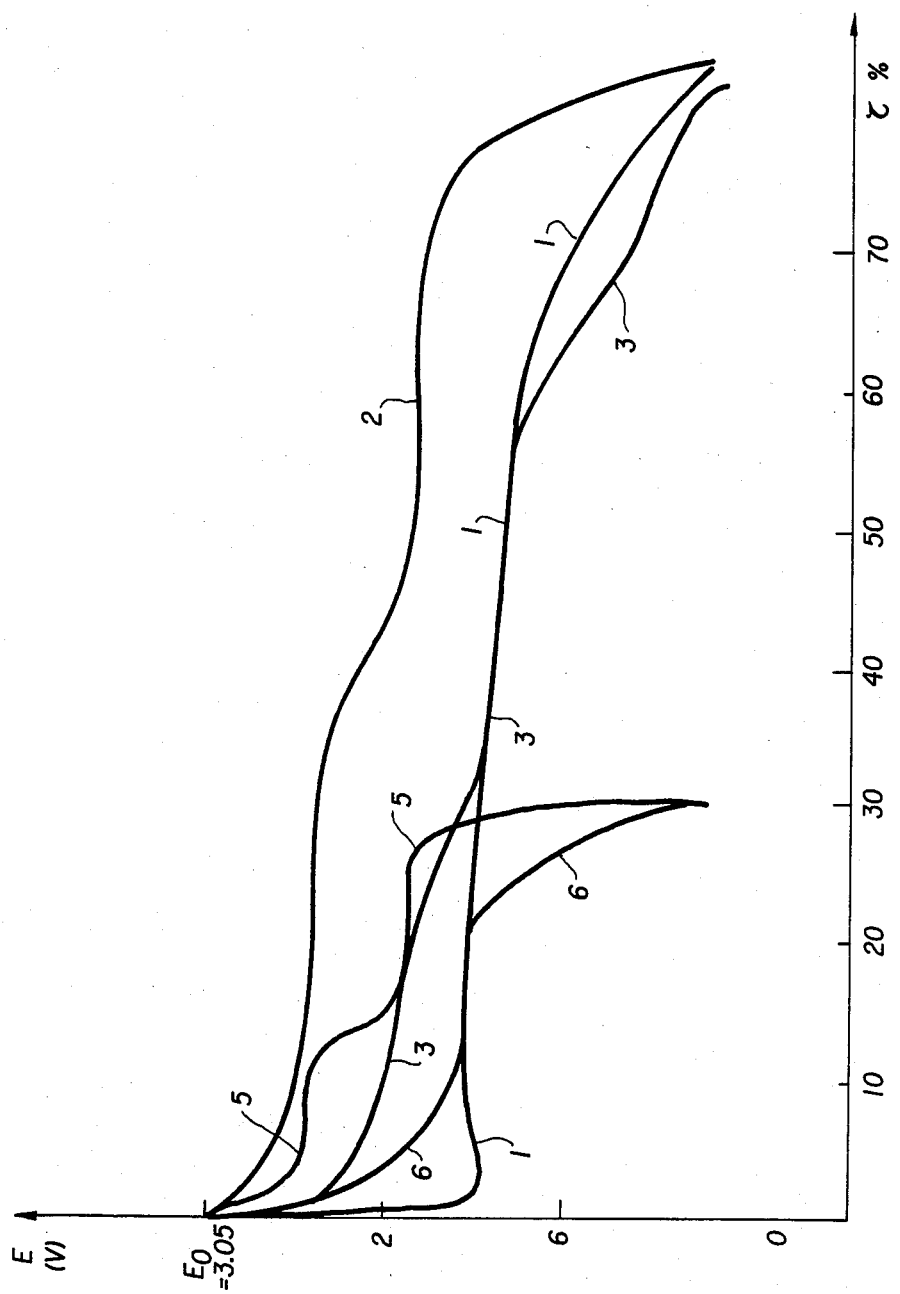

With respect to the composite electrodes obtained with an insertion type electrochemically active material, the electrodes of the generators according to the invention present the following particularity.

Insertion type composite electrodes can be described as being formed of grains coated with macromolecular material constituting the electrolyte, whether they be grains of active material or grains of electronic conduction material. During a discharge, the ions corresponding to the negative electrode material are inserted in the active material of the positive electrode thus provoking an increase of its volume, whereas during charge, this volume decreases. It is recalled that this insertion reaction as well as the reverse reaction does not cause any new phase to appear. The said variations of volume are perfectly compensated by the macromolecular material which is elastomeric. Thus, at any given moment, i.e. during either charge or discharge, a charge end or a discharge end, grains of electrochemically active material coated by the macromolecular material of the electrolyte are present and in direct contact with said macromolecular material.

As to electrodes according to the invention, during charge or discharge, unitary grains of electrochemically active material or agglomerates of these grains are present, the said grains or the said agglomerates being in contact with, or even wholly surrounded by new phases corresponding to the secondary species generated, these new phases appearing at the periphery of the unitary grains and at the periphery or within the agglomerates. The whole is surrounded by macromolecular material. This appearance of new phases, or, on the contrary their disappearance, creates differences in volume that are compensated by the elastomeric character of the macromolecular material of the electrolyte. Since the diffusion and conversion phenomena can only involve peripheral phases, i.e. those in direct contact with the macromolecular material of the electrolyte, it will be thus understood that in the electrode according to the invention, the convexion and the diffusion are severely limited and that these phenomena are much weaker than in the case where active materials are in contact with a liquid electrolyte. In particular, this phenomenon does not involve species situated within agglomerates of grains of active material.

Therefore, the present invention also concerns an electrochemical generator of the above-mentioned type wherein the active material of its positive composite electrode is a displacement material and wherein, during the charges and the discharges of this generator, the said composite electrode comprises unitary grains of active material and/or agglomerates of grains of active material, the said unitary grains or the said grains of the agglomerates being in contact with the phases that correspond to the species generated during the electrochemical process, the whole being coated in the macromolecular material with ionic conduction.

In the case where the electrode comprises simply unitary grains each grain is coated with a layer comprising the new phases.

By way of macromolecular material utilized to obtain the solid solution of the electrolyte or that of the electrode, the two solutions being either identical or different, it is possible to utilize a copolymer of ethylene oxide and a second compound chosen from among the substituted or non-substituted cyclic ether oxides in order to carry out the invention in an advantageous way.

The second compound of the copolymer can be selected from among the substituted cyclic ether oxides represented by formula (1)

in which R represents:
either an alkyl or alkenyl Ra radical having from 1 to 12, preferably from 1 to 4 carbon atoms;
or a $CH_2$—O—Re—Ra radical, in which Ra has the same signification as herein-above and Re represents a polyether radical of the formula —($CH_2$—$CH_2$—O)$_p$, varying from 0 to 10, and the proportion of the second compound with respect to the ethylene oxide is selected so that the ionic conduction macromolecular material does not present crystallinity at the temperatures of use, while presenting good conductivity.

Radical R can be an alkyl radical, preferably a methyl radical, and the second compound is present in a quantity from 0 —not included— to 25% by molar percentage with respect to the total number of moles. This percentage is preferably comprised between 1.5 and 25% when the salt is lithium perchlorate, and it is higher than 5% when the salt is lithium trifluoromethane-sulfate.

Radical R can also be a $CH_2$—O—Re—Ra or O—CH=$CH_2$ or $CH_2$—O—$CH_2$—CH=$CH_2$ radical and the second compound is present in a quantity ranging from 0 —not included— to 30%, the percentage being a molar percentage expressed with respect to the total number of moles of the electrolyte. This percentage is preferably comprised between 1.5 and 30%. When the salt is lithium perchlorate and higher than 5% when the salt is lithium trifluoromethane-sulfonate.

According to one particular embodiment of the invention, the second compound of the copolymer is selected from among the substituted or non-substitued cyclic ether oxides, the cycle of which comprises more than three links. Its molar pecentage is preferably comprised between 0—not included— and 30%.

By way of non limitative example, these cyclic ether oxides the cycle of which comprises more than three links can be: oxetane, tetrahydrofurane, 1-3.dioxane, dioxolane and their substituted derivatives.

In the case where the second monomer compound is selected from among the ether oxides of formula (I), the chain obtained has an ethylene polyoxide structure of which certain hydrogen atoms are substituted by radicals. This chain has a regular alternance of two carbons atoms and one oxygen atom:

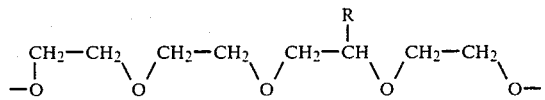

In the case where the second compound is selected from among the cyclic ether oxides the cycle of which comprises more than three links, a polyether chain is obtained in which the oxygen atoms can be separated by more than two carbon atoms or by a single carbon atom, according to the nature of the second starting compound.

For example, a methyl-3-oxetane-ethylene oxide copolymer will have the following structure

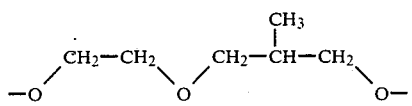

a dioxolane-ethylene oxide copolymer will present the following formula:

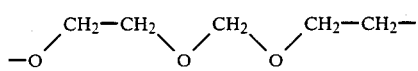

and a methyl 4-THF-ethylene oxide copolymer the following formula:

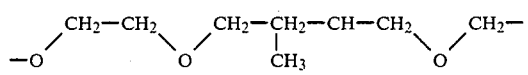

According to a preferred embodiment of the invention, the cation of the salt in solution in the macromolecular material of the electrolyte and of the electrode is a $Li^+$ cation and the metal displacement compound, reductible by lithium, is a chalcogenide of an element selected from among iron, cobalt, nickel, manganese, lead, bismuth, copper, silver and mercury.

According to a first embodiment of the invention, the metal displacement compound is a sulfide, and preferably a mono- or di-sulfide.

According to a second embodiment of the invention, this metal displacement compound is a manganese oxide $MnO_2$, a copper oxide $CuO$ or $Cu_2O$, a lead oxide, or a bismuth oxide.

According to a third embodiment of the invention, the metal compound is a metal phosphate.

Therefore, according to the invention, an electrochemical current generator is obtained and can reversibly operate according to a great number of cycles, at temperatures ranging from ambient temperature, this generator utilizing, as electrode material, materials that do not essentially give rise to displacement reactions, i.e. reactions that generate new species, these reactions being able to utilize more than one electron and being simultaneous with insertion reactions.

Without wishing herein to furnish limitative explanations, the applicants consider that the good rechargeability at ambient temperature of the generators obtained according to the invention can be attributed not only to the fact that the active material of the electrode is contained in a composite electrode comprising as electrolyte a copolymer that allows operating at ambient temperature but also to the fact that the transport selectivity in the electrolyte and the solid nature of the electrolyte inhibit the convexion of the intermediary species and block, or at least limit, the diffusion of these species. In particular, the ionic species with a charge higher than or equal to 2 diffuse very slowly in such an electrolyte, which is due to their cross linking action. Furthermore, the absence of fluidity and the elastomeric properties of this electrolyte are favorable to the maintenance of the contacts between one another, of the species generated during the electrochemical displacement process.

The generators according to the invention thus allow to utilize, as electrode material, easily available standard materials certain of which can release more than one electron per atom of active material.

Figure 2:
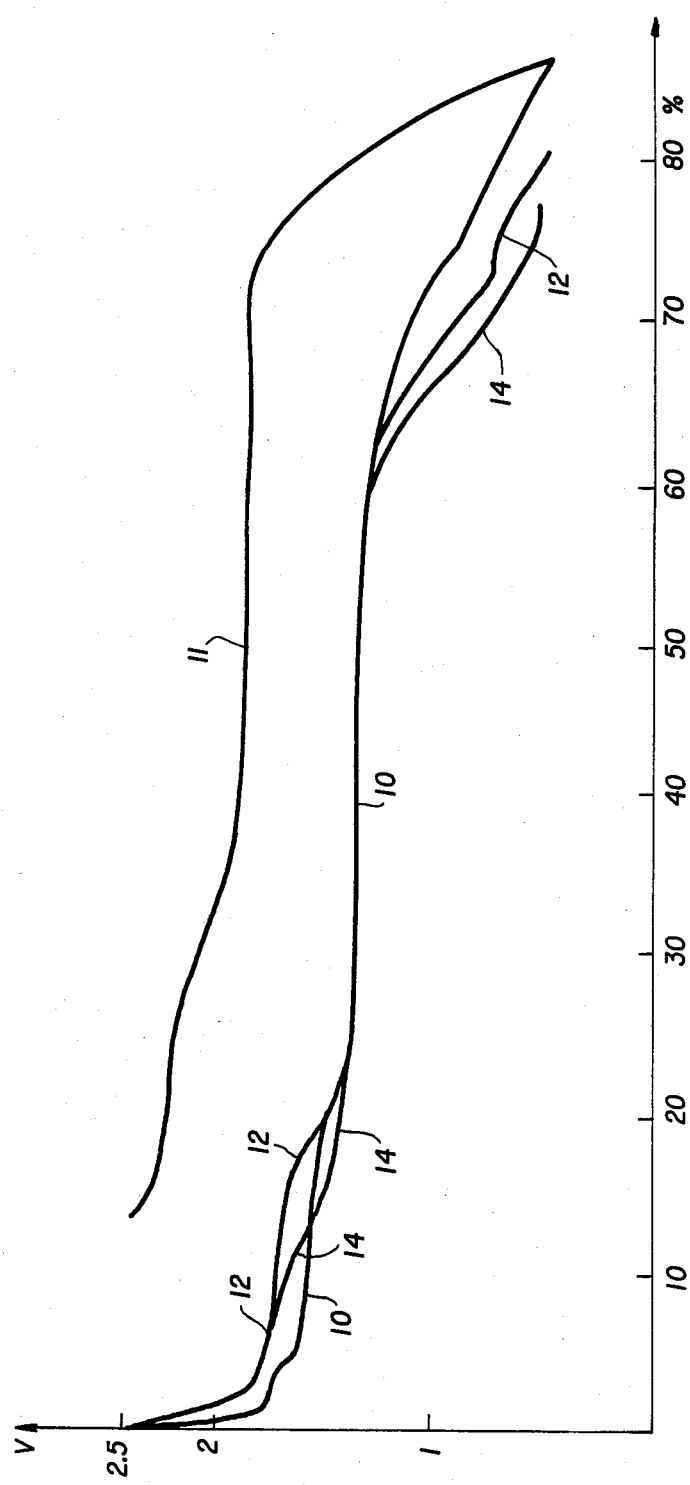
Figure 3:
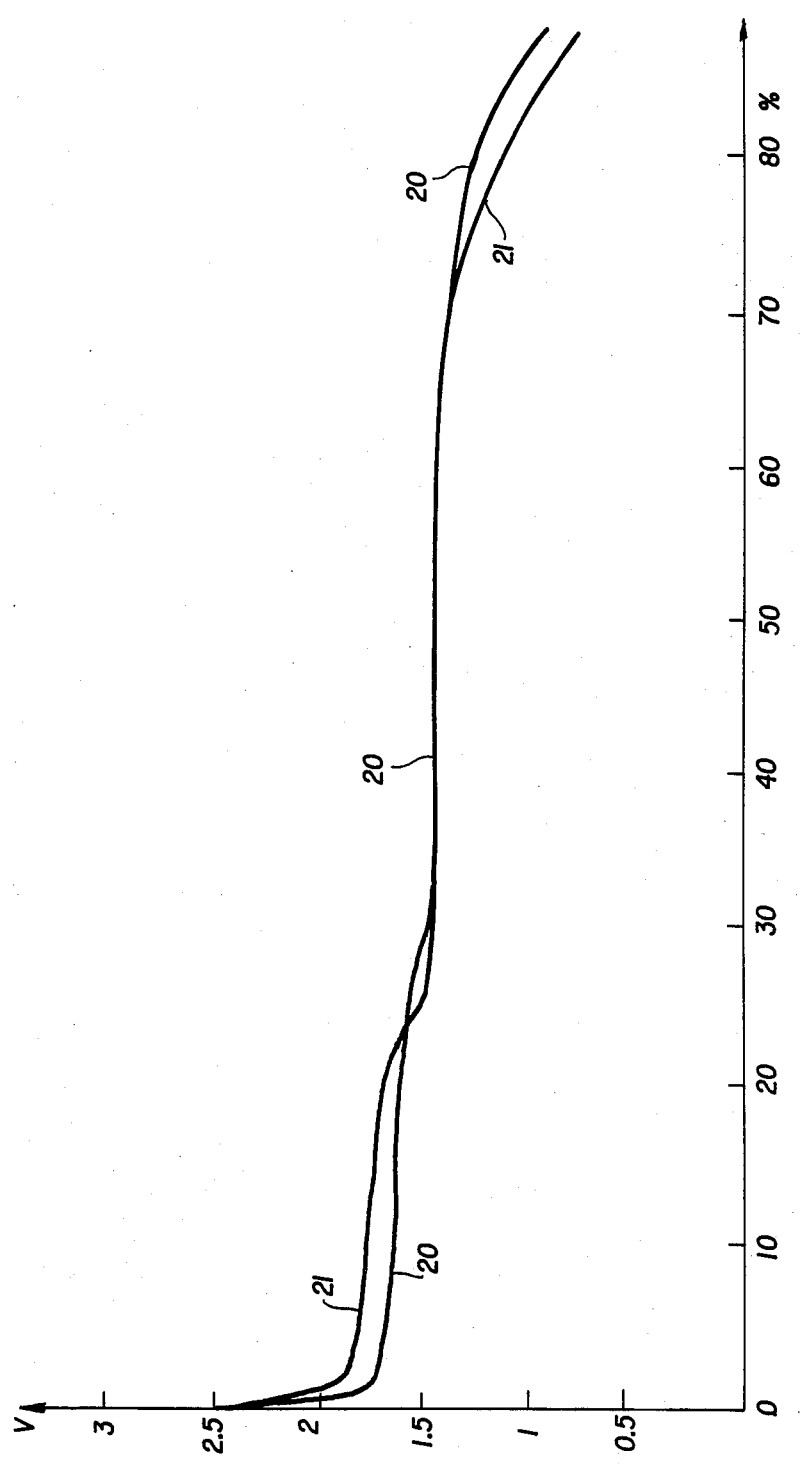
Figure 4:
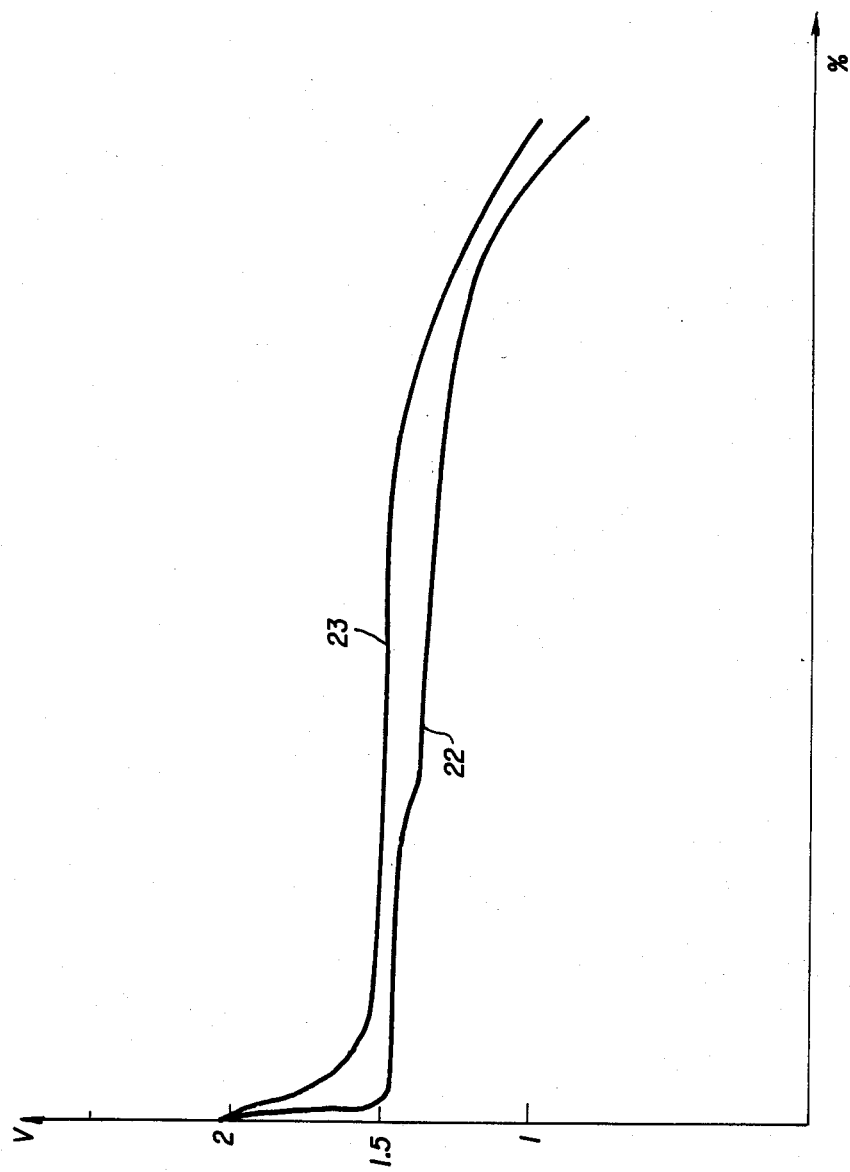
Figure 5:
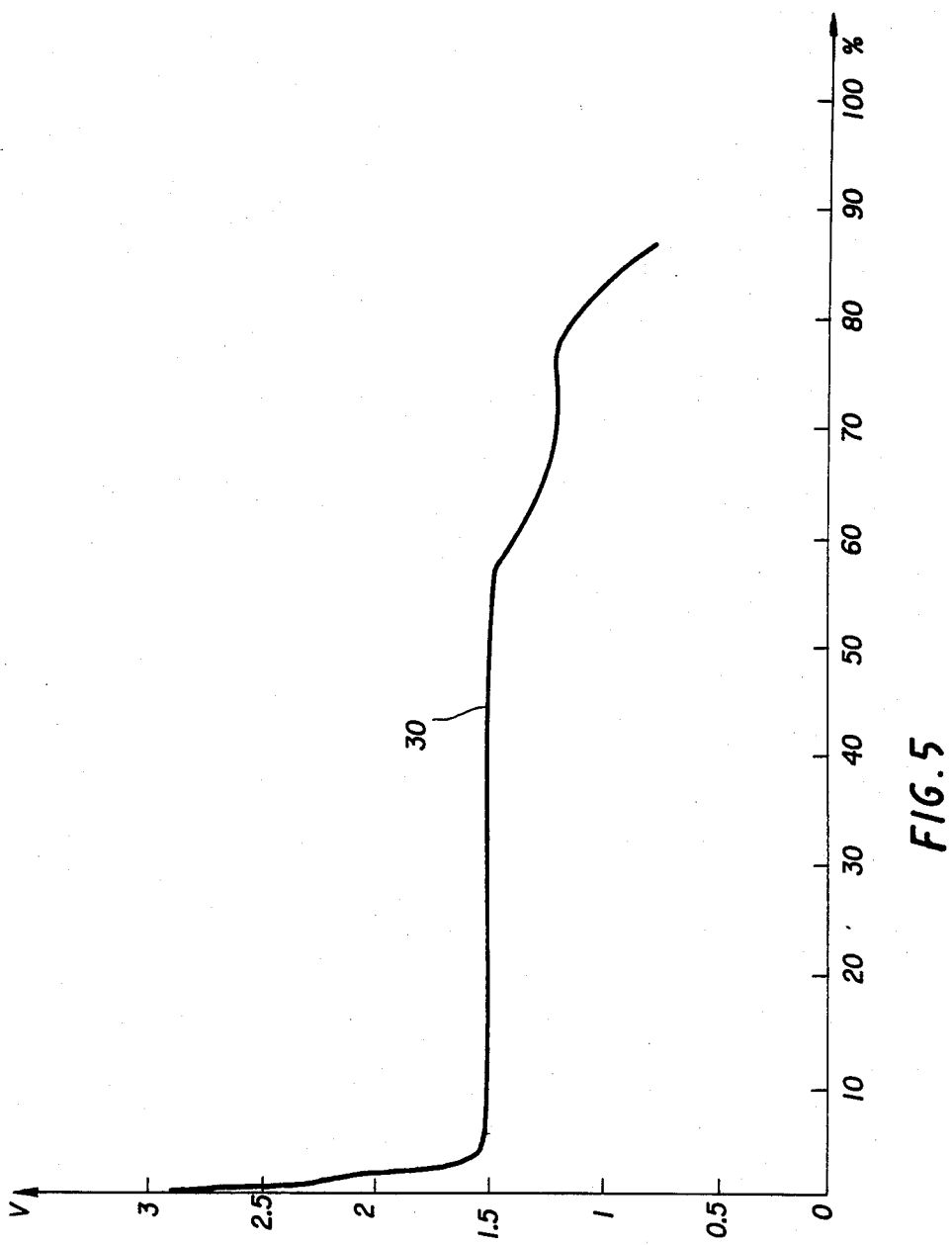
Figure 6:
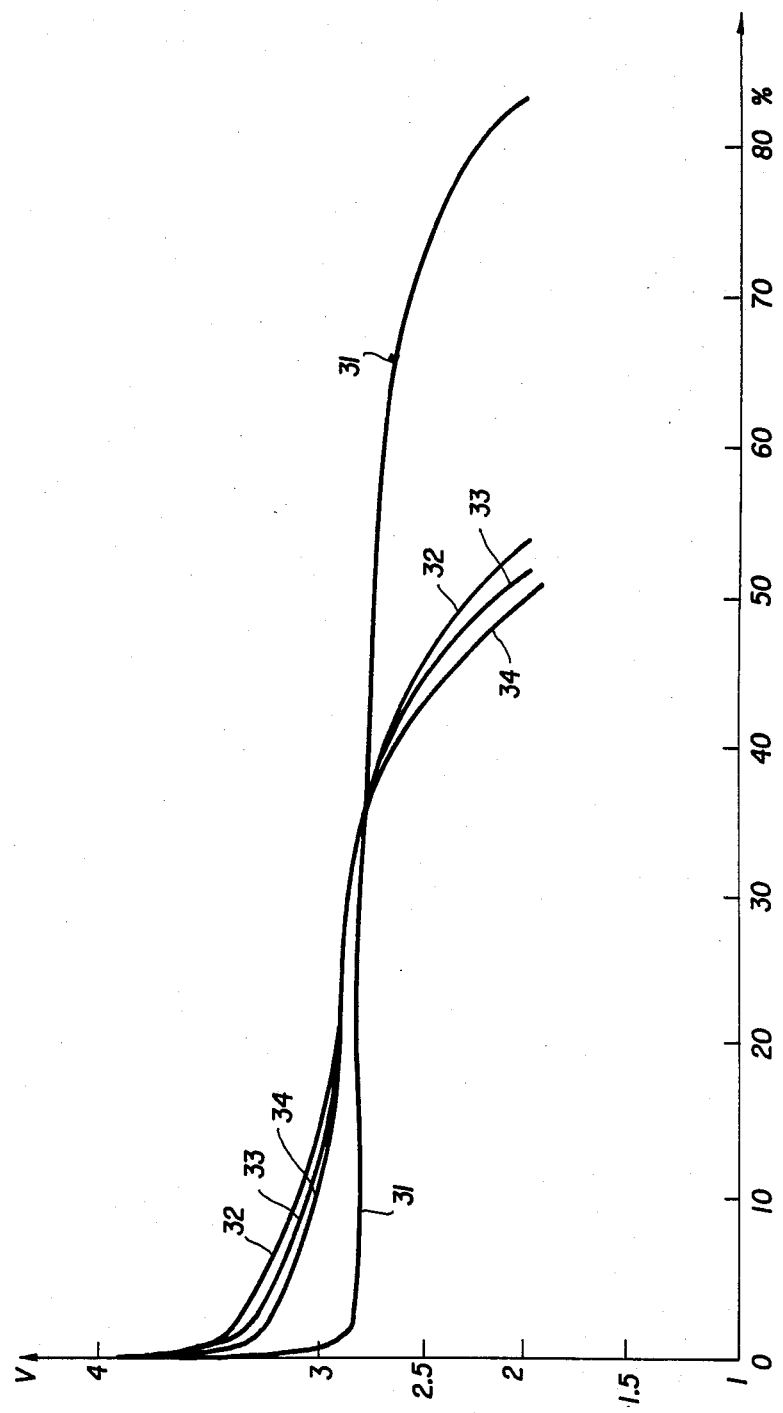
Figure 7:
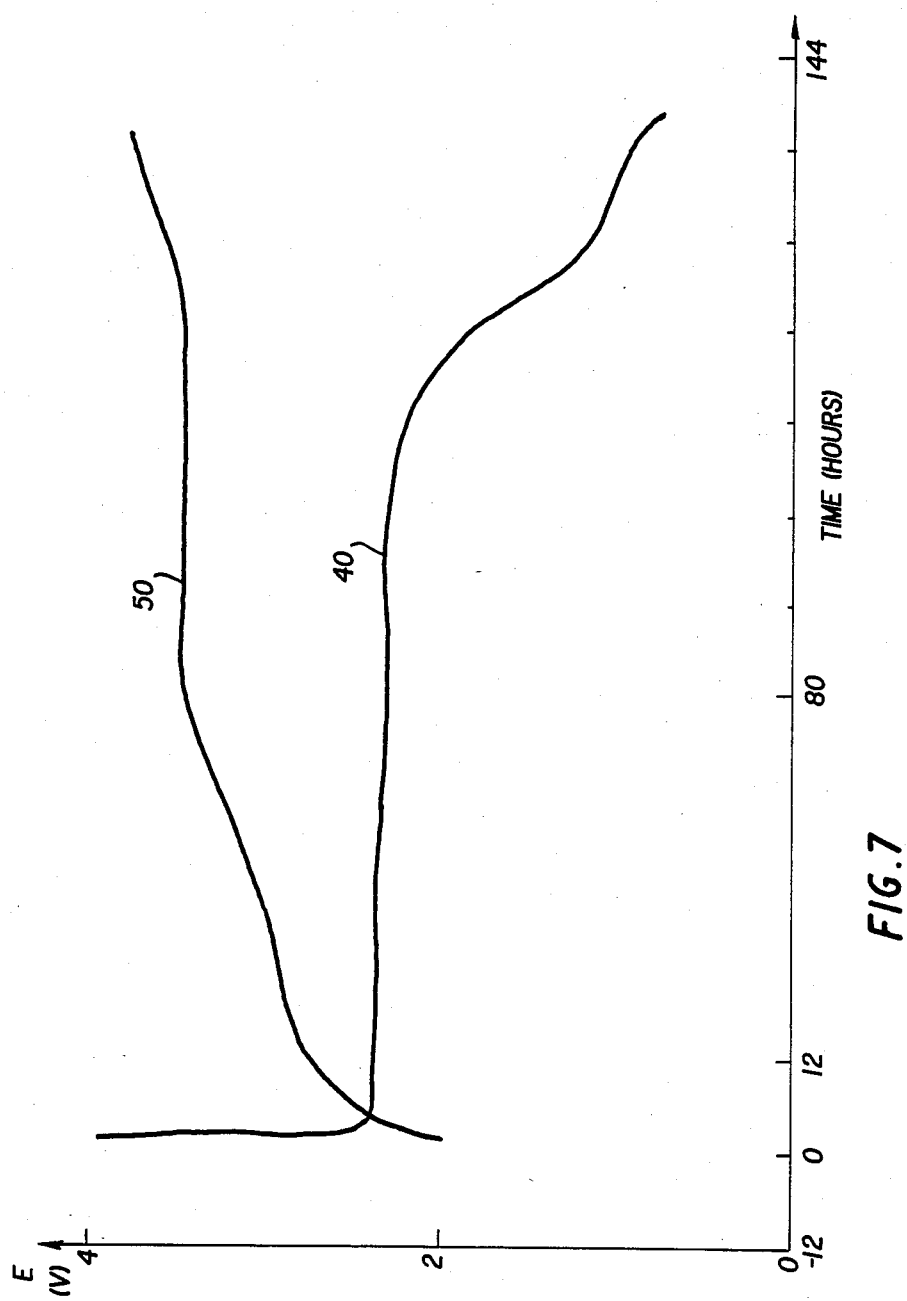

The invention will be, however, better understood by reading through the following examples, given by way of non-limitative illustration, with reference to the appended drawings, all of which represent discharge-charge graphs for accumulators, i.e. the voltage variations as a function of utilization rate, the said rate being equal to the ratio of recovered energy to total energy. These different figures concern different electrode materials, namely:

FIG. 1 $FeS_2$
FIG. 2 $NiS_{1.75}$
FIG. 3 $NiS$
FIG. 4 $FeS$
FIG. 5 $CoS_2$
FIG. 6 $MnO_2$
FIG. 7 $Cu_4O(PO_4)_2$

FIRST SERIES OF EXAMPLES

The following generator, referenced generator A, was realized with the following elements: a negative electrode constituted by a foil of lithium having a thickness of 100 microns. A polymer electrode constituted by a solid solution of lithium perchlorate in an ethylene oxide-glycidyl methyl oxide ether (EO-GME) polymer, comprising 10% by weight GME. In this solution, the number of hetero-atoms of the copolymer/number of cation atoms ratio is equal to 20/1. The positive electrode is a composite electrode, obtained through spreading, on an aluminum foil, the following mixture: EO-GME electrolyte, 15% GME by weight, comprising in solution $LiClO_4$ at 20/1 (73% by volume);
carbon black (7% by volume);
$FeS_2$, in the form of a powder having a granulometry comprised between 10 and 15 microns, obtained from natural pyrite, utilized without processing.

The positive electrode has a capacity of 3.61 $C/m^2$ (Coulomb per $cm^2$), the total thickness of the generator is $200\mu$. Generator A is cycled at 26° C. under a constant current density equal to $7\mu A/cm^2$, FIG. 1 represents graph 1 of the first discharge of the accumulator up to about 80% utilization, which, in function of the capacity of the electrode allows to state that about 3.4 electrons have been released. The graph (2) represents the first recharge of the accumulator. This graph shows clearly the two charateristic levels of $FeS_2$. Furthermore, curve (3) of the voltage evolution during the 35th discharge has been represented. This 35th discharge allows to release 3.2 electrons, these electrons as in the first recharge- being counted with respect to a $FeS_2$ molecule. This high number of electrons clearly shows that the final species are mainly $Li_2S$ and metallic iron, which was confirmed by an X-ray analysis. Further, it may be noted that curves (1) and (3) coincide over a large portion of the utilization rate, which shows the good rechargeability of the accumulator since it was possible to carry out thirty-five cycles without a decrease in activity.

In the same series of examples, accumulator A' was produced in an identical way to accumulator A, apart from replacing $FeS_2$ powder by a mixture of iron powder and lithium sulfide powder $Li_2S$, in such proportions that the following stoechiometric ratio is maintained: 2 $Li_2S$, 1 Fe, and with a granulometry smaller than $5\mu$ this generator is cycled at the same temperature and under the same current density. To do this, first of all accumulator A' is charged so as to raise its potential up to a value of EO=3.05 V (identical to that of accumulator A). The fact of being able to charge this accumulator A' clearly shows that the reactions involved are displacement reactions between $Li_2S$ and Fe. Accumulator A' is thereafter cycled and curve (5) represents the second charge and curve (6) the 35th discharge.

It is noted that for this accumulator A' the utilization rate is 30% (whereas it was about 80% for A) but that the same number of cycles as for A is obtained. The results may be explained in the following way. The good rechargeability is due to the transport limitation within the electrolyte. The low utilization rates are due to the fact that the same contact maintaining properties are not obtained as in accumulator A. In accumulator A', the two initial components are not in complete contact during the electrochemical processes, such as the species for $FeS_2$.

From this comparative example, it is possible to draw the conclusions that the rechargeable generators according to the invention operate well, on the one hand due to the transport limitations in the electrolyte, but also on the other hand due to the maintaining in contact of the species generated during the transport reactions.

Furthermore, in the same series of examples, a new accumulator A' was produced and made to operate at 75° C. A considerable drop in the utilization rate and the potential of the reaction was noted, this drop becoming steeper during cycling. This appears to confirm, therefore, that the diffusion phenomena that exist at high temperature are prejudicial and that the invention allows, on the contrary, satisfactory operation at ambient temperature. If the same test is carried out with accumulator A, it will be observed that the phenomenon noted for A' is much more limited.

SECOND SERIES OF EXAMPLES

Accumulator B is produced, identical to accumulator A apart from the fact that the displacement material is $NiS_{1.75}$, for which the capacity of the positive electrode is 2.33 C/cm². A series of charge-discharge cycles is carried out and certain curves are represented in FIG. 2. The curve of the first discharge (10) starts at 2.5 V and shows a discharge up to 90% of utilization. The curve of the first charge does not require any particular comment. Curve (12) represents the second discharge and curve (14) the hundredth discharge. Curves (10), (12) and (14), coincide over a considerable portion and if a substantial evolution between the first and the second discharge can be noted, very slight evolution can be noted between the second discharge and the hundredth discharge.

Furthermore, this example again shows clearly that displacement reactions are present since if insertion reactions existed, it would be necessary to respect the stoechiometric formula of $NiS_2$.

THIRD SERIES OF EXAMPLES

Two accumulators C and D are produced, that are identical to accumulator A but with the following characteristics:

|  | C | D |
| --- | --- | --- |
| electrode. Mat. | NiS | FeS |
| capacity C/cm² | 2,3 | 1,6 |

These accumulators are cycled under a constant current intensity (d=7.5 $\mu A/cm^2$) at 26° C. For accumulator C, curve 20 of FIG. 3 represents the first discharge and curve 21 of FIG. 3 represents the recharge. For accumulator D, curve 22 of FIG. 4 represents the first discharge and curve 23 of FIG. 4 represents the tenth discharge.

It will be noted that the aspect of these curves represented in FIGS. 3 and 4 is very similar to that of the curves obtained for the same materials utilized with molten salt electrolytes, for which it is perfectly known that NiS and FeS operate according to displacement processes. Study of these materials in molten salt is set out in IREQ report No. 2779 "Recherche et developpement sur les accumulateurs en sels fondus" G. VASSORT, M. GAUTHIER, D. FAUTEUX, R. BELLEMARE.

This example shows clearly that the invention concerns not only displacement disulfides but also displacement monosulfides.

FOURTH SERIES OF EXAMPLES

In this example, an accumulator E is cycled identical to accumulator A but its positive electrode comprises cobalt disulfide $CoS_2$ and the macromolecular material of its electrolyte is an ethylene oxide-propylene oxide copolymer. Cycling is carried out at 26° C. with a current density of 7 $\mu A/cm^2$.

At FIG. 5, curve 30 represents the tenth discharge, that clearly shows that at the tenth discharge 85% utilization is still obtained, i.e. 3.4 electrons are recovered, and the discharge plateau is situated at 1.5 V. The discharge curves obtained for about one hundred cycles are identical to curve 30.

FIFTH EXAMPLE

In this example, accumulator F, identical to A but in which the electrode material is a manganese dioxide $MnO_2$, is cycled (75 cycles) at 26° C. with current density of 8 $\mu A/cm^2$.

FIG. 6 represents the cycling curves obtained.

Curve 31 is the first discharge, curve 32 is the second discharge, curve 33 is the 25th discharge and 34 is the 75th discharge.

After the first discharge up to 80%—the accumulator was recharged at 52% utilization. The second discharge supplies about 50% utilization, which means that a charge to discharge ratio of 1 is obtained. This ratio is found for the other cycles, too.

This cycling, obtained with non-optimalized materials, shows a surprising effect of the invention since $MnO_2$ had always been considered as being unable to give rise to reversible cycles in association with a polymer electrolyte or with any other electrolyte.

SIXTH EXAMPLE

This example concerns a generator the active material of which is a copper oxyphosphate $Cu_4O(PO_4)_2$.

The generator of this example is constituted in the following way:

Electrolyte: ethylene oxide/butylene oxide copolymer (EO-BO) comprising 18% by weight $LiClO_4$.
Negative electrode: lithium foil of 60 microns thickness.
Positive electrode: on an aluminium collector (foil of 15 Microns thickness) is deposited by spreading:
65% by weight of $Cu_4O(PO_4)_2$
5% by weight of acetylene black
6% by weight of a OE-GME copolymer and
24% by weight of $LiClO_4$.

The positive electrode had a thickness of 20 microns and the electrolyte a thickness of 95 microns and the whole was presented in the form of a circular lozenge having a diameter of 1 cm. The capacity for the positive electrode was thus 7.5 $\mu Ah/cm^2$ (total 3.6 mA).

This generator was subjected to successive discharge and charge cycles at a constant current intensity of 16 $\mu A/cm^2$ and a temperature of 40° C. (or a regime of C/470).

The stabilized functioning curves (more than 50 cycles) are represented in FIG. 7 (curve 40 for the discharges and curve 50 for the charges). They show a discharge plateau at 2.36. By interrupting the discharge at 1 V, utilization rates from 30% are observed, for the passage of two electrons per atom of copper; this corresponds to an effectively recovered energy of 8 $Cb/cm^2$.

The present invention is not, however, limited to the embodiments given herein-above but, on the contrary, covers all varients. For example, it is obvious that the macromolecular material can have crosslinks or not.

We claim:

1. An electrochemical generator capable of operating reversibly at ambient temperature, comprising:
    (1) a negative electrode;
    (2) an electrolyte constituted by a solid solution of at least one salt in solution in a macromolecular material, the said solid solution being constituted to a large extent by an amorphous polyether structure and possessing sufficient ionic conductivity to allow operation of the generator at ambient temperature; and
    (3) a composite positive electrode constituted by the agglomeration product of a solid solution of at least one of the said salt in solution in a macromolecular material essentially constituted by an amorphous polyether structure and an electrochemically active material which is at least one metal compound selected from the group consisting of $NiS_{1.75}$, NiS, FeS, $CoS_2$, and $Cu_4O(PO_4)_2$.

2. The electrochemical generator of claim 1, wherein the said metal compound is $NiS_{1.75}$.

3. The electrochemical generator of claim 1, wherein the said metal compound is NiS.

4. The electrochemical generator of claim 1, wherein the said metal compound is FeS.

5. The electrochemical generator of claim 1, wherein the said metal compound is $CoS_2$.

6. The electrochemical generator of claim 1, wherein the said metal compound is $Cu_4O(PO_4)_2$.

7. An electrochemical generator capable of operating reversibly at ambient temperature, comprising:
    (1) a negative electrode;
    (2) an electrolyte constituted by a solid solution of at least one salt in solution in a macromolecular material, the said solid solution being constituted to a large extent by an amorhous polyether structure and possessing sufficient ionic conductivity to allow operation of the said generator at ambient temperature; and
    (3) a composite positive electrode constituted by the agglomeration product of a solid solution of at least one of the said salt in solution in a macromolecular material essentially constituted by an amorphous polyether structure and an electrochemically active material which is at least one metal compound selected from the group consisting of $NiS_{1.75}$, NiS, FeS, $CoS_2$, and $Cu_4O(PO_4)_2$, wherein the said metal compound is a displacement compound.

8. The electrochemical generator of claim 7, wherein the said metal compound is $NiS_{1.75}$.

9. The electrochemical generator of claim 7, wherein the said metal compound is NiS.

10. The electrochemical generator of claim 7, wherein the said metal compound is FeS.

11. The electrochemical generator of claim 7, wherein the said metal compound is $CoS_2$.

12. The electrochemical generator of claim 7, wherein the said metal compound is $Cu_4O(PO_4)_2$.

13. The electrochemical generator of claim 1, wherein during either a charging or a discharging cycle of the said generator, the composite electrode comprises unitary grains of active material or agglomerates of grains of active material, wherein the said unitary grains or grains of the said agglomerate are in contact with the phases that correspond to the species generated during the electrochemical process, the whole being coated in the macromolecular material with ionic conduction.

14. The electrochemical generator of claim 13, wherein the said macromolecular material is a copolymer of ethylene oxide and a second compound comprising a substituted cyclic ether oxide or a non-substituted cyclic ether oxide.

15. The electrochemical generator of claim 14, wherein the said substituted cyclic ether oxide is a compound of the formula (I):

in which R is an alkyl or alkenyl radical $R_a$ having from 1 to 12 carbon atoms or a $CH_2-O-R_e-R_a$ radical, in which $R_e$ is a polyether radical of the formula $-(CH_2-CH_2-O)_p$, wherein p is a number from 0 to 10.

16. The electrochemical generator of claim 15, wherein R is $CH_2-O-R_e-R_a$ or $O-CH=CH_2$ or $CH_2-O-CH_2-CH=CH_2$ and the second compound is present in a quantity of up to 30 molar percent.

* * * * *